US012799008B2

(12) United States Patent
Cho et al.

(10) Patent No.: US 12,799,008 B2
(45) Date of Patent: Nov. 17, 2026

(54) TOXIC WASTE TREATMENT PROCESS AND TREATMENT APPARATUS

(71) Applicant: LG Chem, Ltd., Seoul (KR)

(72) Inventors: Manki Cho, Daejeon (KR); Hyun Woog Ryu, Daejeon (KR); Bonsik Joo, Daejeon (KR); Jeong Kyu Kim, Daejeon (KR); Yeon Hwa Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 694 days.

(21) Appl. No.: 18/270,424

(22) PCT Filed: Sep. 14, 2022

(86) PCT No.: PCT/KR2022/013717

§ 371 (c)(1),
(2) Date: Jun. 29, 2023

(87) PCT Pub. No.: WO2023/043185

PCT Pub. Date: Mar. 23, 2023

(65) Prior Publication Data

US 2024/0116791 A1 Apr. 11, 2024

(30) Foreign Application Priority Data

Sep. 14, 2021 (KR) ........................ 10-2021-0122723
Sep. 30, 2021 (KR) ........................ 10-2021-0129931

(51) Int. Cl.
*C02F 9/00* (2023.01)
*C02F 1/24* (2023.01)
(Continued)

(52) U.S. Cl.
CPC .................. *C02F 9/00* (2013.01); *C02F 1/24* (2013.01); *C02F 1/52* (2013.01); *C02F 11/008* (2013.01);
(Continued)

(58) Field of Classification Search
CPC ........ C02F 1/24; C02F 1/52; C02F 2101/363; C02F 2101/365; C02F 11/008;
(Continued)

(56) References Cited

U.S. PATENT DOCUMENTS

2021/0346566 A1 11/2021 Kumkrong et al.

FOREIGN PATENT DOCUMENTS

CN 101099973 A 1/2008
CN 101624256 A 1/2010
(Continued)

OTHER PUBLICATIONS

Wang, et al. "Low temperature pyrolysis characteristics of oil sludge under various heating conditions." Energy & fuels 21.2 (2007): 957-962 (Year: 2007).*

(Continued)

*Primary Examiner* — Anthony J Zimmer
*Assistant Examiner* — Eric Scott Sherman
(74) *Attorney, Agent, or Firm* — Lerner David LLP

(57) ABSTRACT

The present disclosure relates to a toxic waste treatment process and treatment apparatus including: a temperature raising operation of raising a temperature of a toxic waste solid to a heat treatment temperature selected from 300° C. to 600° C. at an average temperature raising rate of 5° C./min or less; and a heat treatment operation of heat-treating the toxic waste solid at the heat treatment temperature.

19 Claims, 4 Drawing Sheets

(51) Int. Cl.

| | |
|---|---|
| ***C02F 1/52*** | (2023.01) |
| ***C02F 11/00*** | (2006.01) |
| ***C02F 11/12*** | (2019.01) |
| ***C02F 11/18*** | (2006.01) |
| *C02F 101/36* | (2006.01) |
| *C02F 103/36* | (2006.01) |

(52) U.S. Cl.
CPC ............... *C02F 11/12* (2013.01); *C02F 11/18* (2013.01); *C02F 2101/363* (2013.01); *C02F 2103/365* (2013.01)

(58) Field of Classification Search
CPC ........... C02F 11/12; C02F 11/13; C02F 11/18; C02F 11/00; C02F 11/004
See application file for complete search history.

(56) References Cited

FOREIGN PATENT DOCUMENTS

| | | | | | |
|---|---|---|---|---|---|
| CN | 105363760 | A | | 3/2016 | |
| CN | 112175647 | A | | 1/2021 | |
| CN | 112823063 | A | | 5/2021 | |
| JP | H1088149 | A | | 4/1998 | |
| JP | H11248117 | A | | 9/1999 | |
| JP | 2000088219 | A | | 3/2000 | |
| JP | 2001108218 | A | | 4/2001 | |
| JP | 2003-266042 | A | | 9/2003 | |
| JP | 2003266042 | | * | 9/2003 | ............... B09B 3/00 |
| JP | 2005296870 | A | | 10/2005 | |
| JP | 2005305302 | A | | 11/2005 | |
| JP | 2008272566 | A | | 11/2008 | |
| JP | 2009136812 | | * | 6/2009 | ............. Y02A 40/20 |
| JP | 2009136812 | A | | 6/2009 | |
| JP | 2009-262082 | A | | 11/2009 | |
| JP | 2011218344 | A | | 11/2011 | |
| JP | 2013028687 | A | | 2/2013 | |
| KR | 20040064460 | A | | 7/2004 | |
| KR | 20060009055 | A | | 1/2006 | |
| KR | 100693939 | B1 | | 3/2007 | |
| KR | 20110129845 | A | | 12/2011 | |
| KR | 20170018134 | A | | 2/2017 | |

OTHER PUBLICATIONS

Gopang, et al. "Characterization of the sludge deposits in crude oil storage tanks." Journal of Faculty of Engineering & Technology 23.1 (2016): 57-64 (Year: 2016).*

Search Report dated Oct. 30, 2025 from the Office Action for Chinese Application No. 202280008674.9 issued Nov. 1, 2025, 4 pages.

International Search Report for PCT/KR2022/013717 mailed Jan. 2, 2023. 3 pages.

Cho, M-H. et al., "Pyrolysis of Mixed Plastic Wastes for the Recovery of Benzene, Toluene, and Xylene (BTX) Aromatics in a Fluidized Bed and Chlorine Removal by Applying Various Additives" energy & fuels, Dec. 2009, pp. 1389-1395.

Search Report dated May 26, 2026 from the Office Action for Chinese Application No. 202280008674.9 issued May 28, 2026 pp. 1-2.

* cited by examiner (a)

(b)

TOXIC WASTE TREATMENT PROCESS AND TREATMENT APPARATUS

This application is a national phase entry under 35 U.S.C. § 371 of International Application No. PCT/KR2022/013717, filed on Sep. 14, 2022, which claims priority to and the benefit of Korean Patent Application Nos. 10-2021-0122723 and 10-2021-0129931 filed in the Korean Intellectual Property Office on Sep. 14, 2021 and Sep. 30, 2021 the entire contents of which are incorporated herein by reference.

TECHNICAL FIELD

The present disclosure relates to a toxic waste treatment process and treatment apparatus, and more particularly, to a treatment process and a treatment apparatus for removing toxicity from toxic waste with high efficiency.

BACKGROUND ART

With the advancement of modern society, various kinds of products are being developed and produced. In a product producing process, such as chemical processes, toxic waste may be intensively generated as reaction by-products, and after the reaction is completed, the reaction by-products are mixed with condensate and discharged in the form of wastewater. If such toxic wastewater is discharged to the outside as it is, the toxic wastewater may cause serious environmental pollution, consequently, the toxic wastewater must be treated. In a general mass production process, the amount of such polluted wastewater is very large, while the concentration of toxic substances is very small, so an economical toxic treatment method is very rare. Some toxic substances show fatal toxicity even in trace amounts. The most well-known toxic treatment method is high-temperature incineration, but it is very uneconomical to incinerate all the contaminated wastewater as it is. As other treatment methods, biodegradation, photolysis, catalytic decomposition, and the like are known, but these technologies are still in the research and development stage and lack reliability in removal efficiency.

Toxic waste solids can be removed and reduced in toxicity through high-temperature incineration at 1,200° C., but they have several limitations. Representatively, due to problems, such as high energy and facility costs, resynthesis of toxic substances due to the action with dust generated during incomplete combustion and incineration, and the discharge of the large amounts of $CO_2$ and atmospheric pollutants, such as NOx/SOx, high-temperature incineration is no longer a sustainable solution for toxic waste solids.

DETAILED DESCRIPTION OF THE INVENTION

Technical Problem

The present disclosure is to solve the problems of the prior art, and to provide an eco-friendly toxic waste treatment process and treatment apparatus capable of achieving a high rate of removing toxicity from waste having a high concentration of toxic components.

Technical Solution

An exemplary embodiment of the present invention provides a toxic waste treatment process including: a temperature raising operation of raising a temperature of a toxic waste solid to a heat treatment temperature selected from 300° C. to 600° C. at an average temperature raising rate of 5° C./min or less; and a heat treatment operation of heat-treating the toxic waste solid at the heat treatment temperature.

Another embodiment of the present invention provides a toxic waste treatment process including: a temperature raising operation of raising a temperature of a toxic waste solid to a heat treatment temperature selected from 300° C. to 600° C., in which when a temperature of the toxic waste solid is 200° C. or more, a temperature raising rate is adjusted to an average of 5° C./min or less; and a heat treatment operation of heat-treating the toxic waste solid at the heat treatment temperature.

According to the exemplary embodiment, it is possible to supply heat to the toxic waste solid by dividing a temperature section from the temperature raising operation to the heat treatment operation into six or more temperature zones.

According to the exemplary embodiment, the process may further include before the temperature raising operation, a heat treatment operation of performing the heat treatment on the toxic waste solid at 200° C. or less.

According to the exemplary embodiment, the toxic waste solid may have a toxic concentration of 10,000 to 200,000 pg I-TEQ/g.

According to the exemplary embodiment, the content of octachlorinated dibenzofuran (OCDF) and octachlorinated dibenzodioxin (OCDD) in toxic polychlorinated dibenzofuran (PCDF) and polychlorinated dibenzodioxin (PCDD) contained in the toxic waste solid is 90 wt % or more.

According to another exemplary embodiment, the process further includes forming the toxic waste solid by inputting a coagulant to toxic wastewater before the temperature raising operation, and separating a solid and a liquid in a flotation tank.

According to another exemplary embodiment, the process further includes after forming the toxic waste solid, at least one of the dehydration operation, a particle size or component adjusting operation, a pulverizing or crushing operation, and a drying operation.

According to another exemplary embodiment, the process further includes removing a toxic component from by-product gas generated in the heat treatment operation.

Another exemplary embodiment of the present invention provides an apparatus for treating toxic waste, including: a continuous rotary kiln reactor, in which the continuous rotary kiln reactor includes: a main body for pyrolyzing a waste solid to generate by-product gases and a detoxified sample; a waste solid supply unit for supplying the waste solid into the continuous rotary kiln reactor; a sample outlet for discharging the detoxified sample from the main body; and a plurality of heating units for supplying heat to the main body, and the heating unit raises the temperature of the waste solid from the waste solid supply unit toward a direction of the sample outlet to a heat treatment temperature selected from 300° C. to 600° C. at a temperature raising rate of an average of 5° C./min or less.

Still another exemplary embodiment of the present invention provides an apparatus for treating toxic waste, including: a continuous rotary kiln reactor, in which the continuous rotary kiln reactor includes: a main body for pyrolyzing a waste solid to generate by-product gases and a detoxified sample; a waste solid supply unit for supplying the waste solid into the continuous rotary kiln reactor; a sample outlet for discharging the detoxified sample from the main body; and a plurality of heating units for supplying heat to the main body, and the heating unit raises the temperature to a heat treatment temperature selected from 300° C. to 600° C. from the waste solid supply unit toward the direction of the sample outlet, and when the temperature of the waste solid is 200° C. or higher, the temperature is raised by adjusting the temperature raising rate to an average of 5° C./min or less.

According to the exemplary embodiment, the main body may include temperature sections of six or more zones from the waste solid supply unit toward the direction of the sample outlet, and the heating unit may supply heat to each of the temperature sections.

According to the exemplary embodiment, in the temperature sections, the temperature of the waste solid may be increased at an average rate of 5° C./min or less along a longitudinal direction of the main body.

According to the exemplary embodiment, among the temperature sections, the first temperature section closest to the waste solid supply unit may have a set temperature of 200° C. or lower.

According to the exemplary embodiment, the temperature sections may include a temperature rising section in which the temperature is raised at an average rate of 5° C./min or less to a pyrolysis temperature from the waste solid supply unit to the sample discharge unit, and a temperature maintaining section in which the pyrolysis temperature is maintained after the temperature raising section.

According to another exemplary embodiment, a ratio of a diameter d to a length L of the main body may be 1:8 to 1:20.

According to another exemplary embodiment, the apparatus may further include a pulverizing device for granulating the waste solid before the waste solid is supplied to the continuous rotary kiln reactor. The pulverizing device may be provided with two or more screws which are spaced apart from each other. In the pulverizing device, a gap between the screws is 50 mm to 200 mm, and the number of rotations is 120 RPM or less.

According to another exemplary embodiment, the apparatus may include a condensing cleaner including any one or more of a condensing unit for condensing the by-product gas and a cleaning unit for cleaning the by-product gas.

According to another exemplary embodiment, the apparatus may further include a cooling device for receiving the detoxified sample from the sample outlet and cooling the received detoxified sample.

According to another exemplary embodiment, the apparatus may further include a temperature measuring sensor for measuring the temperatures of the temperature sections.

Advantageous Effects

According to the toxic waste treatment process according to the exemplary embodiments of the present invention, it is possible to achieve a level of 90% or more of the total toxicity removal rate and a residual toxic concentration of 3,000 pg I-TEQ/g or less within waste from ultra-high-concentration toxic waste with only the heat treatment by inducing dechlorination, molecular destruction, and catalytic oxidation instead of evaporation of toxic components through the adjustment of the heat treatment temperature profile, such as the adjustment of the heat treatment temperature raising rate.

In addition, the toxic waste treatment process of the present disclosure may be performed in a nitrogen atmosphere and an atmosphere in which the concentration of oxygen is 21 vol % or less. For example, when the reaction condition is a nitrogen atmosphere, it is possible to effectively adjust the residual toxic concentration to be very low by inhibiting the resynthesis of toxic PCDD and PCDF during and after the heat treatment process, and the average degree of chlorine substitution of PCDF contained in by-product gas generated in the heat treatment process may be the level of 5 to 6, and accordingly, a post-process after the heat treatment process may be facilitated. In the atmosphere in which the reaction condition is an oxygen concentration of 21 vol % or less, it is possible to achieve a high total toxicity removal rate by inducing molecular destruction instead of dechlorination of toxic components.

Thereby, since most toxic components in the toxic waste may be removed, it is possible to establish an eco-friendly process.

According to the toxic waste treatment apparatus according to other exemplary embodiments of the present invention, the efficiency of removing toxicity of the waste solid including high concentrations of toxicity is increased and toxic components may be prevented from being resynthesized.

In another exemplary embodiment of the present invention, it is possible to continuously supply the waste solid from the pulverizing device to the continuous rotary kiln reactor through the waste solids supply unit.

EXPLANATION OF REFERENCE NUMERALS AND SYMBOLS

Figure 1:
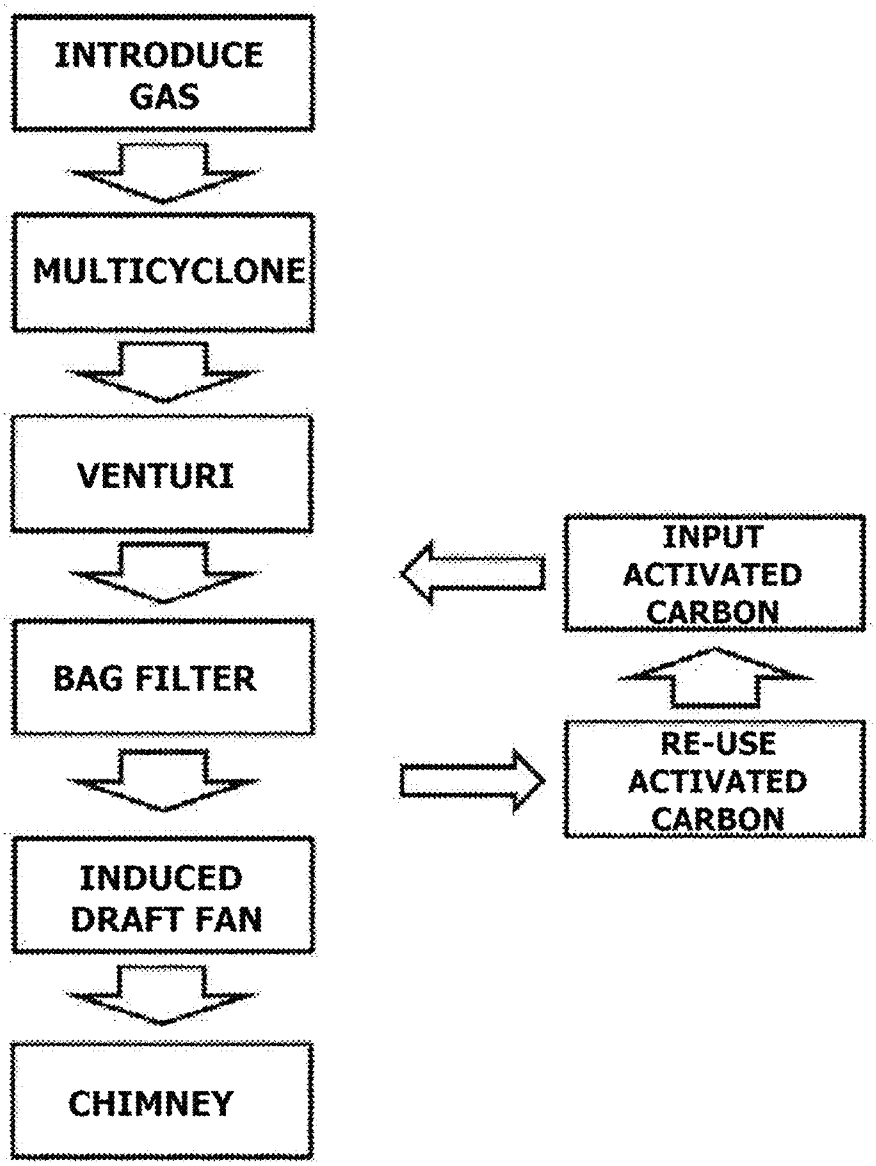
FIG. 1 is a processing flow chart illustrating a toxic substance treatment method in the related art.

100, 100': Waste treatment system
10: Pulverizing device
11: Case
12: Screw
13: Waste solid input unit
14: Particle discharge unit
20: Continuous rotary kiln reactor
21: Main body
22: Waste solid supply unit
**22*a***: Hopper
**22*b***: Moving unit
23: Gas supply unit
24: By-product gas discharge unit
25: Sample discharge unit
26: Heating unit
30: Cooling device
40: Condensing cleaner
50: Activated carbon filter

DETAILED DESCRIPTION

Hereinafter, the present invention will be described in more detail.

Terms or words used in the present specification and the claims shall not be interpreted to be limited as general or lexical meanings, and on the principle that the inventor can appropriately define a concept of a term for describing the invention by the best method, the terms or the words shall be interpreted as a meaning and a concept corresponding to the technical spirit of the present invention.

An exemplary embodiment of the present invention provides a toxic waste treatment process including: a temperature raising operation of raising a temperature of a toxic waste solid to a heat treatment temperature selected from 300° C. to 600° C. at an average temperature raising rate of 5° C./min or less; and a heat treatment operation of heat-treating the toxic waste solid at the heat treatment temperature.

Techniques for detoxifying solids containing toxic substances include pyrolysis, thermal desorption, and high-temperature incineration. Pyrolysis is a technology developed and applied to mainly remove small amounts of toxic components remaining in incinerators after burning wastes, and is a method of removing toxic components by dechlorinating or thermally destructing toxic components in incinerators through heat treatment at an appropriate level. Thermal desorption and high-temperature incineration are techniques mainly applied to purify soil polluted by toxic components, and is the concept of heating polluted soil to a temperature above the vaporization temperature of toxic components to remove toxicity from the soil by evaporation or thermal destruction, and incinerating of exhaust gas including evaporated toxic components at a high temperature.

However, the toxic waste solid to which the present disclosure is applied has a distinct difference from the sample to which the above two detoxification techniques are mainly applied.

The toxic waste solid to which the treatment process according to the exemplary embodiment of the present invention is applied has a moisture content of more than 0 wt % and 90 wt % or less, for example, may be at a level of 30 wt % to 80 wt %. The toxic waste solid has a very high concentration of toxic components compared to the incineration ash or soil as described above. The toxic waste solid has a pH of 5 to 10. The toxic waste solid to which the treatment process according to the exemplary embodiments of the present invention is applied is an ultra-toxic waste solid having a toxic concentration of 10,000 to 200,000 pg I-TEQ/g. In particular, the distribution of toxic substances (Dioxin's Congener) of the toxic waste solid is very different from that of general incinerated ash or soil, and specifically, the ratio of OCDF and OCDD with a chlorine substitution degree of 8 is very high. Specifically, the content of octachlorinated dibenzofuran (OCDF) and octachlorinated dibenzodioxin (OCDD) in toxic polychlorinated dibenzofuran (PCDF) and polychlorinated dibenzodioxin (PCDD) contained in the toxic waste solid is 90 wt % or more. In addition, the toxic waste solid may have a Cu content of 0 ppm to 10,000 ppm based on a dry sample having a moisture content of 1 wt % or less. In addition, the toxic waste solid may have a Cl content of 0 ppm to 100,000 ppm based on a dry sample having a moisture content of 1 wt % or less. The toxic waste solid may be wastewater sludge generated as a by-product of a petrochemical process.

For example, when the pyrolysis method, which is mainly applied to incineration ash, is applied to the ultra-toxic waste solids, there is a possibility that the toxicity removal efficiency is low due to high moisture content, high toxic concentration, and OCDF/OCDD ratio. In addition, when the thermal desorption and high-temperature incineration methods, which are mainly applied to polluted soil, are applied, the toxicity is not removed well at the existing operating temperature due to the high boiling point of OCDF and OCDD contained in the large amount in toxic waste solids, or energy consumption may increase due to the high temperature used, and this technology mainly evaporates high-concentration toxic components in toxic samples in the primary heat treatment operation and destroys the toxic components in a high-temperature incinerator (secondary heat treatment), so it has a disadvantage in that there may be an operating burden of the incinerator and it may be difficult to comply with emission regulations of toxic components.

Unlike the existing techniques as described above, according to the exemplary embodiment of the present invention, pyrolysis by heat treatment is performed, and the toxicity removal rate may be increased by adjusting a temperature raising rate from room temperature to a heat treatment temperature so that toxic components may be removed by dechlorination, thermal destruction, and catalytic oxidation without evaporation. According to an exemplary embodiment, the rate of raising the temperature to the heat treatment temperature in the temperature raising operation is an average of 5° C./min or less, preferably an average of 3.5° C./min or less, more preferably an average of 2.5° C./min or less, more preferably an average 1° C./min to 3° C./min, average 1° C./min to 2.5° C./min, or average 1° C./min to 2.2° C./min. Here, the average temperature raising rate is a value calculated based on the time the temperature was raised during the entire temperature raising time.

According to one exemplary embodiment, it is possible to supply heat to the toxic waste solid by dividing a temperature section into six or more temperature zones from the temperature raising operation to the heat treatment operation.

The set temperature of each zone may be adjusted to 200° C. for a first zone, 250° C. for a second zone, 300° C. for a third zone, 350° C. for a fourth zone, 400° C. for a fifth zone, and 450° C. for a sixth zone, and the temperature raising rate may be adjusted to an average of 5° C./min. In this case, the set temperature means a target temperature, and heat may be separately supplied to raise the temperature to the set temperature of each zone.

The temperature of the waste solids may be raised to 200° C. while moving from the first zone to the second zone, and the temperatures of the waste solids may be raised from 200° C. to 250° C. while moving from the second zone to the third zone.

The temperature section divided from the temperature raising operation to the heat treatment operation may include a temperature rising section and a temperature maintaining section. The temperature rising section and the temperature maintaining section may each include one or more zones, and the temperature rising section preferably includes the temperature section of six or more temperature zones. At this time, in the temperature maintaining section, heat is supplied for maintaining the set temperature.

In this case, in the temperature rising section, the temperature may be raised to the pyrolysis temperature at a rate of 5° C./min or less, and the temperature maintaining section may maintain the pyrolysis temperature raised through the temperature raising section. In addition, in the temperature maintaining section, the pyrolysis temperature may be maintained at a temperature of 400° C. to 600° C. for 240 minutes or less. When the maintaining time of the temperature maintaining section exceeds 240 minutes, the effect of increasing the efficiency of removing the toxicity of waste solids is insignificant compared to the increase in the amount of energy used to maintain the temperature of the temperature maintaining section. In this case, the time when the temperature is raised may be referred to as the temperature rising operation, and the time when the pyrolysis temperature raised through the temperature raising section is maintained may be referred to as the pyrolysis operation.

For example, when a main body 21 includes five zones of the temperature raising section and one zone of the temperature maintaining section, the set temperature of each zone may be adjusted to 200° C. for the first zone, 250° C. for the second zone, 300° C. for the third zone, 350° C. for the fourth zone, 400° C. for the fifth zone, and 400° C. for the sixth zone, and the temperature raising rate may be an average of 5° C./min.

In the temperature raising operation, the temperature section from the initial temperature to the heat treatment temperature may be divided into temperature sections of one or more zones, two or more zones, three or more zones, four or more zones, five or more zones, or six or more zones to raise the temperature of the toxic waste solid.

According to one exemplary embodiment, the toxicity removal rate after the heat treatment operation is 80% or more, preferably 85% or more, more preferably 90% or more.

The toxicity removal rate may be calculated as follows.

Toxicity removal rate (%)={(initial sample [based on moisture content 1 wt %] toxic concentration×sample mass)−(total amount of toxicity in by-product gas)}/(initial sample [based on moisture content 1 wt %] toxic concentration×sample mass)×100

The total amount of toxicity in the by-product gas is obtained by analyzing the amount of toxic components after collecting the total amount of the by-product gas generated in the heat treatment operation by using an organic solvent, such as toluene or hexane.

Toxic waste solids to which the treatment process according to the exemplary embodiment of the present invention is applied may be wastewater sludge generated as a petrochemical process by-product. Toxic components derived from the petrochemical process are mixed with the condensate generated in the condensing process at the end of the reaction and discharged as contaminated wastewater. The amount of wastewater discharged at this time is tens of tons per hour. The wastewater may be mixed with incinerator wastewater that is discharged after incineration of chlorine-based heavy substances generated during the synthesis process and the purification process. Incinerator wastewater may also contain toxic components.

Another exemplary embodiment of the present invention provides a toxic waste treatment process including: a temperature raising operation of raising a temperature of a toxic waste solid to a heat treatment temperature selected from 300° C. to 600° C., in which when a temperature of the toxic waste solid is 200° C. or more, a temperature raising rate is adjusted to an average of 5° C./min or less; and a heat treatment operation of heat-treating the toxic waste solid at the heat treatment temperature. In the present exemplary embodiment, in the operation of raising the temperature of the toxic waste solid, the contents described in the above-described exemplary embodiments may be applied, except that the temperature raising rate is adjusted to an average of 5° C./min or less when the temperature of the toxic waste solid is 200° C. or more. In order to shorten the total reaction time and improve process efficiency, if necessary, the temperature of the toxic waste solids is relatively quickly raised up to the level of 200° C., and from the temperature of 200° C., an improved toxicity removal rate may be achieved by maintaining a low temperature raising rate. Similarly in the exemplary embodiment, the temperature raising rate is an average of 5° C./min or less, preferably an average of 3.5° C./min or less, more preferably an average of 2.5° C./min or less, and still more preferably an average of 1° C./min to 3° C./min, average 1° C./min to 2.5° C./min, average 1° C./min to 2.2° C./min.

In the exemplary embodiment, the temperature raising rate when the temperature of the toxic waste solid is lower than 200° C. may be adjusted to be selected from an average of 5° C./min or more, for example, an average of 10° C./min or more. Through such the rapid temperature rise, an efficient heat treatment may be implemented. The upper limit of the temperature raising rate may be determined as necessary, for example, may be determined at an average of 5° C./min or more and 40° C./min or less.

According to the exemplary embodiment, the toxic waste treatment process of the exemplary embodiments may further include a heat treatment operation of performing a preliminary heat treatment on the toxic waste solid at 200° C. or lower, before the temperature raising operation. The time for performing the preliminary heat treatment operation at 200° C. or lower may be determined as necessary, which may also vary depending on the temperature raising rate. Efficient heat treatment may be implemented through the heat treatment at 200° C. or lower.

According to the exemplary embodiment, the toxic waste treatment process may further include inputting a coagulant to the toxic wastewater before the temperature raising operation, separating a solid from a liquid in a flotation tank, and forming a toxic waste solid through a dehydration operation. When the above operation is performed, the toxic component is mainly collected in the solid phase because the solubility in water is very low. Therefore, treatment of wastewater through a flotation tank may leave most of the toxic components in the toxic waste solids. In order to facilitate solidification of toxic components in the waste, aeration treatment, precipitation treatment, and the like may be performed before the solid and liquid are separated in the flotation tank. In addition, an additional secondary flotation treatment may be performed after the primary flotation treatment, thereby minimizing the residual amount of toxic substances in the wastewater.

According to the exemplary embodiment, the treatment process may further include at least one of a dehydration operation, a particle size or component adjustment operation, a pulverizing or crushing operation, and a drying operation after forming the toxic waste solid.

As described above, since the solid phase separated from the flotation tank has a moisture content of 95% or more, an additional dehydration operation may be performed. Most of the toxic components contained in the existing polluted wastewater have moved to the solid phase material through the flotation tank and other wastewater treatment. The dehydration operation may be performed to adjust the moisture content in the toxic waste solid to 30 wt % to 80 wt %. The dehydration method is not particularly limited, but may be mainly performed by using a filter press, and additionally a decanter, a disk dryer, a rotary dryer, a paddle dryer, a vertical type multi-stage dryer, a cyclone dryer, and the like may be applied. The treatment process according to the exemplary embodiment of the present invention may further include re-inputting the dewatering filtrate generated in the dehydration operation to the front end of the flotation tank or toxic wastewater treatment process, whereby wastewater is reprocessed in the flotation tank. Finally, the solid phase component may be filtered by using the fine filter.

In order to increase the efficiency of the dehydration and the final heat treatment toxicity removal by the method, such as the filter press, the treatment process may further include the operation of adjusting the particle size or component of the toxic waste solid. The particle size or component adjusting operation may include agglomeration and/or flotation operation. By the agglomeration and/or flotation operation, the particle size of the solid phase material may be increased, and the components of the solid phase material may be adjusted. The agglomeration and/or flotation operation may be performed through chemical treatment.

The toxic waste solid obtained through the above method has a moisture content of 30 to 80 wt % and a toxic concentration of 10,000 to 200,000 pg I-TEQ/g, which is very high. In addition, OCDF and OCDD account for 90 wt % or more of toxic PCDF and PCDD. The toxic waste solid may be discharged in the form of wet powder or may be discharged in the form of a pressed cake by using a filter press machine.

The toxic waste solid, except for moisture, includes the ratio of organic matter/inorganic matter of 3:7 to 7:3 by weight, specifically 4:6 to 6:4, for example, 1:1. The ratio of the organic matter/inorganic matter may vary depending on the type or amount of the chemical input to the above-described flotation tank treatment operation, agglomeration operation, or flotation operation.

According to the exemplary embodiment, the toxic waste solid includes at least one element of Cu, Ca, Mg and Al.

According to the exemplary embodiment, the toxic waste solid has a Cu content of 500 ppm or more, preferably 1,000 to 5,000 ppm. In the case where the toxic waste solid has the foregoing Cu content, heat treatment efficiency and stability, which will be described later, may be improved.

According to the exemplary embodiment, the toxic waste solid includes at least one element of Ca, Mg, Fe and Al, and the sum of the elements is preferably 10,000 ppm or more, preferably 10,000 ppm to 500,000 ppm. In the case of having such a content, heat treatment efficiency, which will be described later, may be increased.

According to the exemplary embodiment, the treatment process may further include at least one of an operation of pulverizing or crushing the toxic waste solid and drying the toxic waste solid if necessary. Through the treatment, it is possible to more effectively transfer heat to the toxic waste solid, thereby exhibiting higher toxicity removal efficiency in conjunction with the heat treatment by the low temperature raising rate, which is a feature of the present disclosure.

By the pulverizing or crushing operation, when the toxic waste solid is prepared into particles, not only may the toxic waste solid be controlled to have a relatively low moisture content compared to the sludge state, but it is also easy to control the moisture content, and the toxic waste solid may be controlled to have a desired moisture content, so that it is advantageous for heat transfer to toxic components to be decomposed in the heat treatment operation. In addition, based on the same mass, the particle form may have a larger surface area than the sludge form, and the large surface area becomes a factor for smooth heat transfer, thereby further increasing the decomposition efficiency by subsequent heat treatment. The pulverizing or crushing operation is not particularly limited as long as it is capable of granulating toxic waste solids. For example, the crushing may be performed using a general crusher, and specifically, a double screw mixer or a jaw crusher may be used.

It is possible to reduce the moisture content in the toxic waste solid by the drying operation, thereby increasing the toxic component removal efficiency and energy efficiency in the heat treatment operation to be described later. The drying operation may be performed in a manner, condition, and time so as to control the moisture content as described above, and is not particularly limited. For example, the drying operation may be carried out by leaving the toxic waste solid at a temperature higher than room temperature and lower than the temperature of the heat treatment operation. The adjustment of drying temperature and the adjustment of moisture content may be performed by using a known method, and may be performed by using a general apparatus used for drying.

In the exemplary embodiment of the present invention, in the heat treatment operation, the toxic waste solid is put into a reactor, for example, an electric furnace (tube furnace), and heat treatment is performed at a reaction temperature of 300° C. to 600° C. and a reaction time of 10 hours or less, so that toxic components may be removed by dechlorination and thermal destruction mechanism of the toxic components. According to an example, the heat treatment operation may be performed for 30 minutes or more and 10 hours or less. The heat treatment operation may be preferably performed by using a cylindrical reactor (rotary kiln).

The dechlorination and thermal destruction mechanism in the heat treatment operation may occur more easily because the inorganic components as described above in the toxic waste solid act as a catalyst during the heat treatment. By the heat treatment operation, the toxicity removal rate may reach a level of 70% or more.

In the case of the rapid temperature raising condition, evaporation of toxic components is predominant compared to dechlorination or thermal destruction/catalytic oxidation of toxic components, so the toxicity removal efficiency is low, but as described above, through the low temperature raising rate, dechlorination and thermal destruction/catalytic oxidation are predominant compared to evaporation, thereby increasing the total toxicity removal efficiency. In other words, according to the present disclosure, by intentionally maintaining a low temperature raising rate during the heat treatment of the toxic waste solid, dechlorination and thermal destruction/catalytic oxidation are induced instead of evaporation of the toxic components, such as OCDF, so that the toxicity removal rate of the ultra-high concentration toxic waste solid may be implemented in the level of 70% or more through only the heat treatment. When the temperature raising rate is not lowered to a level below a certain level, the simple evaporation tendency is stronger compared to the toxicity removal due to dechlorination of OCDF, resulting in a remarkably lowering of the toxicity removal rate to a level of 30% or less.

Residual toxicity in the toxic waste solid in the heat treatment operation is 3,000 pg I-TEQ/g or less, preferably 1,500 pg I-TEQ/g or less, preferably 1,000 pg I-TEQ/g or less, more preferably 100 pg I-TEQ/g or less. After the heat treatment operation, the total mass may be reduced to a level of 70 wt % or less due to decrease in moisture and the organic matter. In addition, most of the OCDF is dechlorinated or thermally decomposed in the heat treatment operation. The average degree of chlorine substitution of toxic PCDF contained in the by-product gas generated in the heat treatment operation may be 4 to 8, preferably 4 or more and less than 8, and more preferably 5 or more and 7.7 or less. For example, when the reaction condition is a nitrogen atmosphere, the average degree of chlorine substitution of PCDF contained in the by-product gas may be 5 to 6 levels. Accordingly, the residual toxic component may be more easily removed in the post-treatment process of the by-product gas compared to the case where a large amount of OCDF is included.

The heat treatment operation may be implemented even in an air environment with oxygen, and in this case, the toxic component can be removed by thermal destruction and catalytic oxidation by the metal components in the waste solid, rather than dechlorination.

The heat treatment operation of the treatment process according to the exemplary embodiment of the present invention may be performed in an air environment with oxygen, but the heat treatment operation according to another exemplary embodiment may be performed in an anaerobic or low oxygen atmosphere. When the heat treatment is performed in an anaerobic or low oxygen atmosphere, dechlorination is promoted as well as toxicity removal by thermal destruction, so that toxicity removal may be performed more efficiently, and it is possible to overcome the disadvantage that it is difficult to lower the residual toxicity level below a certain level due to the resynthesis of toxic components due to oxygen.

In the present specification, the anaerobic atmosphere means an atmosphere in which oxygen is not substantially present in the gas constituting the atmosphere. The heat treatment operation may be performed in a nitrogen atmosphere or an atmosphere in which the concentration of oxygen is 30 vol % or less, preferably 21 vol % or less, and may be performed in an atmosphere in which oxygen is not present at all, that is, the concentration of oxygen is 0 vol %.

The low oxygen or anaerobic atmosphere is not limited to a specific gas, and may be, for example, a nitrogen atmosphere, an inert atmosphere, or a vacuum atmosphere. The inert atmosphere may be an argon atmosphere or a helium atmosphere, but is not limited thereto. Among them, in particular, when a nitrogen atmosphere is applied as the low-oxygen or anaerobic atmosphere, relatively inexpensive nitrogen may be used, which has advantages in that it is economical and the atmosphere composition is easy. The low-oxygen or anaerobic atmosphere may be adjusted by introducing carrier gas to the heat treatment apparatus used in the heat treatment operation.

According to an additional exemplary embodiment of the present invention, the treatment process further includes an operation of removing toxic components from the by-product gas generated in the heat treatment operation. Some toxic components dechlorinated during the heat treatment operation described above may be included in the by-product gas generated during the heat treatment and discharged out of the sample. Therefore, the treatment process may include the operation of further removing the toxic components remaining in the by-product gas.

According to the example, the operation of removing the toxic components from the by-product gas may include an operation selected from a high-temperature incineration operation, an operation of returning after liquefaction and incinerating the waste solid at a high temperature, an operation of re-inputting the liquid into a wastewater treatment plant after scrubbing or liquefaction, an operation of collecting dust, and an operation of catalytic decomposition. Through the operation, the remaining toxic component may be converted into a harmless low-molecular compound, such as carbon dioxide or water. In the operations, in addition to the by-product gas generated in the heat treatment operation, air or oxygen may be input together.

The operation of removing the toxic component from the by-product gas may be performed at a temperature of 900° C. to 1,200° C., preferably 1,000° C. to 1,200° C. The treatment time may be determined as needed, and may be performed, for example, from 5 minutes to 60 minutes.

In the preceding heat treatment operation, most of the OCDF is removed by dechlorination, thermal destruction, or catalytic oxidation. For example, when the reaction condition is a nitrogen atmosphere, the average degree of chlorine substitution of PCDF in the by-product gas may be 6 or less. Since the by-product gas has a lower boiling point than the by-product gas containing a large amount of OCDF, it is easy to transfer the by-product gas to a high-temperature incinerator for removing residual toxic components.

By finally decomposing the toxic components in the post-process as described above, it is possible to achieve the final toxicity removal rate of 99% or more.

The toxic waste treatment process may further include, after the operation of removing the toxic component from the by-product gas, the operation of cooling the gas if necessary. By removing the thermal energy by cooling, when the toxic components are not completely decomposed, the remaining toxic components may be prevented from being resynthesized into toxic components. The cooling may be performed by a generally used method, for example, a method using coolant, and the rapid cooling is preferable in order to suppress resynthesis to the maximum.

According to the exemplary embodiment, the treatment process may further include a scrubbing operation of making the by-product gas pass through a scrubber and/or a dust collecting operation of making the by-product gas pass through a dust collector. Any one of or both the scrubbing operation and the dust collecting operation may be included.

The scrubber used in the scrubbing operation may include at least one of an organic solvent scrubber for removing organic gas and a base solution scrubber for removing acid gas. The by-product gas may be generated after passing through the organic solvent scrubber and then passing through the base solution scrubber. A toluene scrubber may be used as the organic solvent scrubber, and a sodium hydroxide scrubber may be used as the base solution scrubber.

The dust collector used in the dust collecting operation may include a bag filter or the like.

When both the scrubbing operation and the dust collecting operation are included, the order is not particularly limited, and the by-product gas may be passed through the dust collector and then passed through the scrubber, or the by-product gas may be passed through the scrubber and then passed through the dust collector. From the viewpoint of removing harmful gas, the by-product gas may be more preferable to pass through the dust collector first between the scrubber and the dust collector.

Hereinafter, a toxic waste treatment apparatus according to an exemplary embodiment of the present invention will be described in detail with reference to the drawings. However, the drawings are for illustrating the present invention, and the scope of the present invention is not limited by the drawings.

Figure 2:
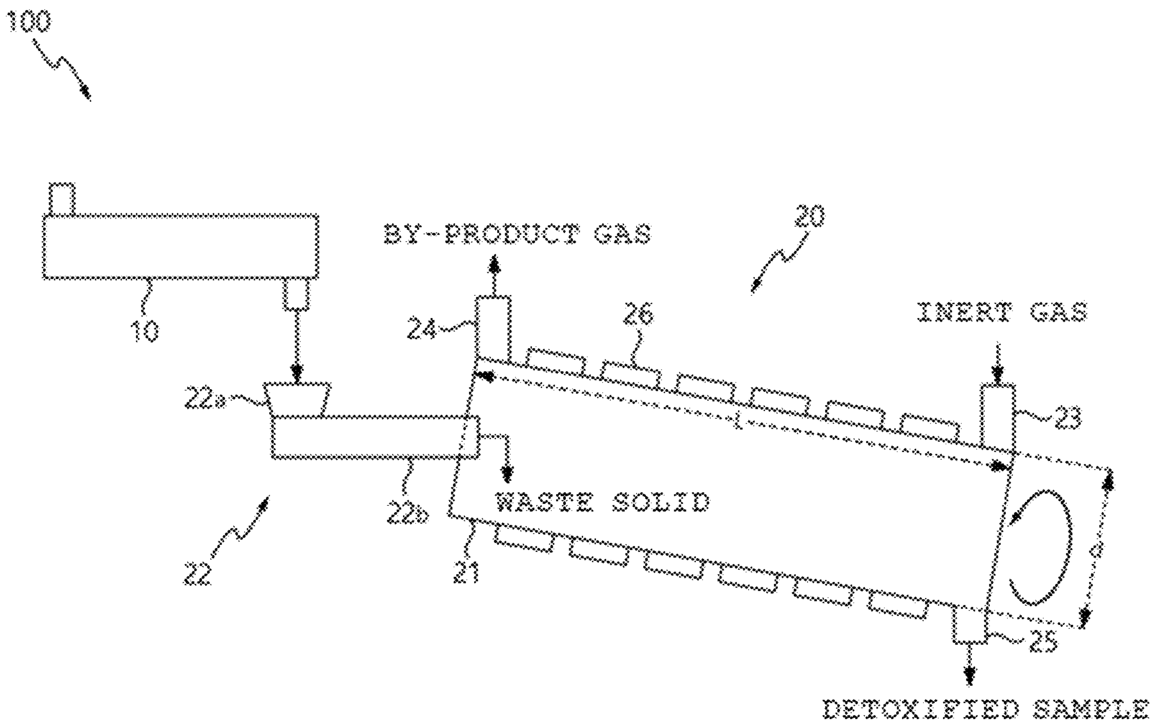
FIG. 2 is a diagram illustrating a toxic waste treatment apparatus according to an exemplary embodiment of the present invention.

FIG. 2 is a diagram illustrating a toxic waste treatment apparatus 100 according to an exemplary embodiment of the present invention.

The toxic waste treatment apparatus 100 includes a pulverizing device 10 and a continuous rotary kiln reactor 20.

The pulverizing device 10 is configured to pulverize the waste solids before the waste solids are supplied to the continuous rotary kiln reactor 20 to be described later, and may granulate the waste solids.

The waste solid may be wastewater sludge generated as a by-product of a petrochemical process. Toxic components derived from the petrochemical process are mixed with the condensate generated in the condensing process at the end of the reaction and discharged as contaminated wastewater. The amount of wastewater discharged at this time is tens of tons per hour. The wastewater may be mixed with incinerator wastewater that is discharged after incineration of chlorine-based heavy substances generated during the synthesis process and the purification process. Incinerator wastewater may also contain toxic components.

According to the exemplary embodiment, a pretreatment apparatus (not illustrated) may input a coagulant into the toxic wastewater, separate the solid and the liquid in the flotation tank, following by dehydrating. The toxic components contained in the waste solids pretreated by the pretreatment apparatus are mainly collected in the solid phase because their solubility in water is very low. Therefore, treatment of wastewater through a flotation tank may leave most of the toxic components in the toxic waste solids. In order to facilitate solidification of toxic components in the waste, aeration treatment, precipitation treatment, and the like may be performed before the solid and liquid are separated in the flotation tank. In addition, an additional secondary flotation treatment may be performed after the primary flotation treatment, thereby minimizing the residual amount of toxic components in the wastewater.

The waste solid may be provided in an agglomerated form, and the pulverizing device 10 is configured to disperse the waste by applying physical force to the waste solids in the agglomerated form. Therefore, the pulverizing device 10 does not affect the moisture content of the waste solid.

Furthermore, the pulverizing device 10 may pulverize the waste solid to a particle size of 1 mm to 50 mm. If the particle size of the waste solids is less than 1 mm, dust is generated in the continuous rotary kiln reactor 20 when the waste solid in the form of the particle is supplied to the continuous rotary kiln reactor 20. Accordingly, there is a problem in that the recovery rate of the detoxified sample generated by thermal decomposition of the waste solid is reduced.

Further, when the particle size of the waste solid exceeds 50 mm, heat is not transferred to the inside of the waste solid particle, so that the possibility that the toxic substances are included in the sample discharged after thermal decomposition increases.

Figure 4:
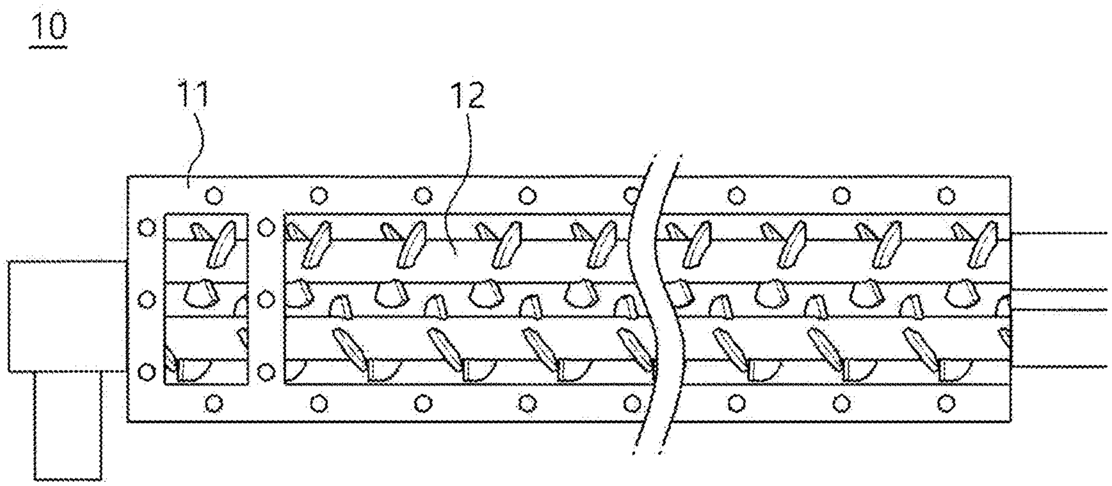
FIG. 4 is a diagram illustrating a pulverizing device according to the exemplary embodiment of the present invention.
Figure 4:
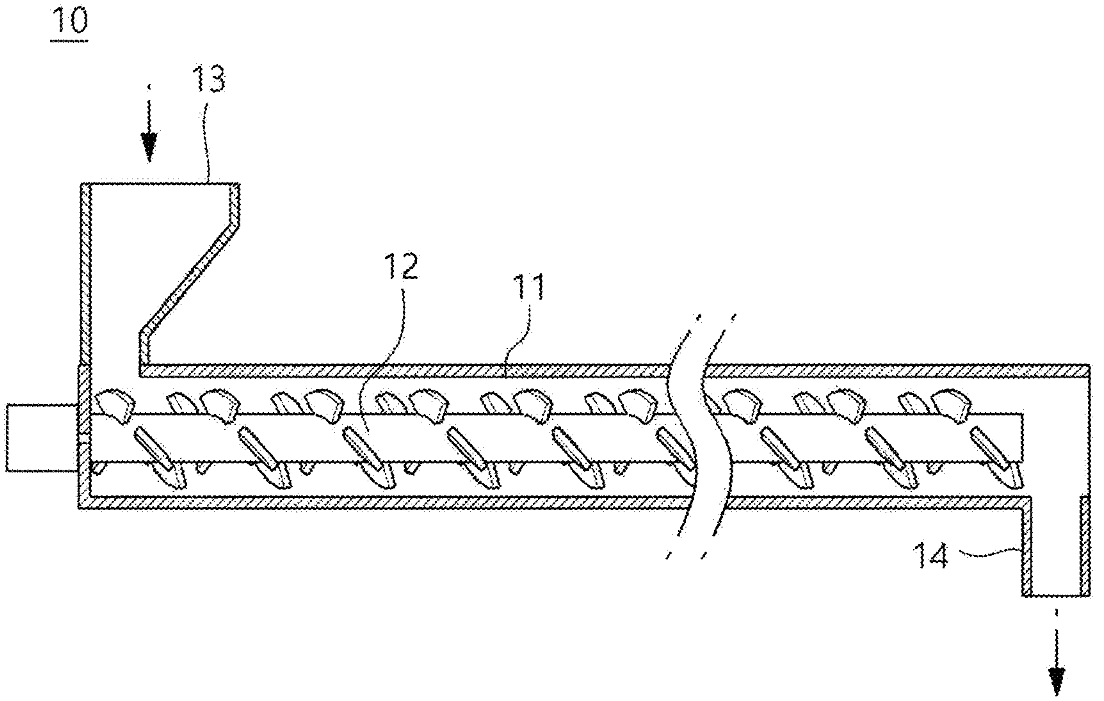

FIG. 4 is a diagram illustrating the pulverizing device 10 according to the exemplary embodiment of the present invention. The pulverizing device 10 may be provided with two or more screws 12 spaced apart inside the case 11 that determines an outer shape of the pulverizing device 10. In addition, the pulverizing device 10 may include a waste solid input unit 13 into which waste solids are input and a particle discharge unit 14 through which the waste solids in the particle form are discharged.

The screw 12 refers to a device that has a spiral-shaped metal wing attached to one surface of a rotation shaft and generates force to push and crush waste solids while rotating.

In one exemplary embodiment, the pulverizing device 10 may be provided with two screws 12 inside the case 11. The waste solid is supplied between the two screws 12 so that, as the two screws 12 rotate, the waste solid may be evenly granulated and crushed without agglomeration.

In this case, a gap between the two screws 12 is 50 mm to 200 mm. When the gap between the screws 12 is less than 50 mm, the particle size of the waste solid becomes small, and dust is generated in the continuous rotary kiln reactor 20 during the pyrolysis process, and when the gap between the screws 12 exceeds 200 mm, there occurs a problem in that the waste solids are agglomerated or granulation is not uniform.

In addition, in the pulverizing device 10, the screw 12 may be rotated at a rate of 120 RPM or less. When the screw 12 is rotated at a rate of more than 120 RPM, a problem occurs in that the particle size of the waste solid becomes small.

The screw 12 may be provided in the form of having wings on the outer circumferential surface of the rotating rotary body. The wing may be provided in a spiral shape, but the shape is not limited as long as the wing is in contact with waste solid to pulverize the waste solid.

In this case, the wing may be formed at an angle of 90 degrees or less with respect to a movement direction of the waste solid. If the wing exceeds 90 degrees with respect to the movement direction of the waste solid, a problem may occur that the waste solids do not move to the particle discharge unit 14.

The continuous rotary kiln reactor 20 is configured to receive and pyrolyze waste solids in the particle form from the pulverizing device 10.

In the exemplary embodiment, the continuous rotary kiln reactor 20 may include a main body 21 that pyrolyzes waste solids to generate by-product gas and detoxified samples, a waste solid supply unit 22 for supplying the waste solid in the form of particle into the main body 21, a gas supply unit 23 for supplying inert gas, a by-product gas discharge unit 24 for discharging the by-product gas generated by thermal decomposition of the waste solids, a sample discharge unit 25 for discharging the detoxified sample generated by thermal decomposition of waste solids, and a plurality of heating units 26 located on the outer circumferential surface of the main body 21 to heat the main body 21.

The waste solid supply unit 22 is configured to receive the waste solid in the particle form from the pulverizing device 10 and supply the waste solid to the inside of the main body 21, and may be provided on the side of the main body 21.

In the exemplary embodiment, the waste solid supply unit 22 may include a hopper **22*a* that receives the waste solids in the particle form from the pulverizing device 10 and a moving unit 22*b* that moves the waste solids into the main body 21**.

The hopper **22*a* may be provided while being in combined with one side of the moving unit 22*b*. The hopper 22*a* may include a shape that is progressively narrower in the direction in contact with the moving unit 22*b***, but the shape is not limited as long as the waste solid can be supplied.

The moving unit **22*b* may move the waste solid in a horizontal direction. Here, the horizontal direction may refer to an axial direction of the continuous rotary kiln reactor 20 or a direction horizontal to the movement direction of the waste solids in the main body 21**.

Accordingly, the moving unit **22*b* may include one or more screws in the body that determines the outer shape of the moving unit 22*b*. Here, the screw may include a form in which wings are provided on the outer circumferential surface of the rotary body. Otherwise, the moving unit 22*b* may include a conveyor belt inside the body. However, the shape of the moving unit 22*b* is not limited as long as the moving unit 22*b*** is capable of horizontally moving the waste solid.

The waste solid supply unit 22 may further include an adjustment unit (not illustrated) for adjusting the amount of waste solid supplied. The adjustment unit may include one or more valves. Here, the valve may include a gate valve, a butterfly valve, a rotary valve, and the like. However, the form of the adjustment unit is not limited as long as the adjustment unit is capable of adjusting the amount of waste solids supplied.

The gas supply unit 23 is configured to supply inert gas into the continuous rotary kiln reactor 20 to adjust the atmosphere to a low oxygen or anaerobic atmosphere. Here, the anaerobic atmosphere includes an atmosphere having an oxygen concentration of 0 vol %, and the low-oxygen atmosphere includes an atmosphere having an oxygen concentration of 21 vol % or less. For example, the anaerobic atmosphere or the low-oxygen atmosphere may include a nitrogen atmosphere, an inert atmosphere, and a vacuum atmosphere.

The gas supply unit 23 may be located on the outer circumferential surface of the main body 21, and the gas supply unit 23 may be formed on the outer circumferential surface of the main body 21 where the heating unit 26 is not formed.

The by-product gas discharge unit 24 may be formed in a direction opposite to the gas supply unit 23 in order to increase the thermal decomposition time of the waste solid. Here, the opposite direction means a direction opposite to the direction perpendicular to the axial direction of the continuous rotary kiln reactor 20.

In addition, when the by-product gas is discharged through the by-product gas discharge unit 24, the inert gas may also be discharged together with the by-product gas.

The sample discharge unit 25 may be formed on the outer circumferential surface of the main body 21 on which the heating unit 26 is not formed. The waste solid supply unit 22 may be located at one end of the main body 21, and the sample discharge unit 25 may be located at the other end of the main body 21. Otherwise, the sample discharge unit 25 may be formed in a direction opposite to the waste solid supply unit 22 with respect to the longitudinal direction of the continuous rotary kiln reactor 20.

The main body 21 may be disposed with temperature sections including six zones or more in the direction from the waste solid supply unit 22 to the sample discharge unit 25. In addition, the respective temperature sections may be maintained at different temperatures. That is, in the continuous rotary kiln reactor 20 according to the present disclosure, the heating unit 26 is located on the outer surface of the main body 21 in each temperature section to differently adjust the temperature of each temperature section.

Unlike a batch-type rotary kiln reactor that raises the temperature of the rotary kiln reactor after supplying waste solids, the continuous rotary kiln reactor 20 raises the temperature of the continuous rotary kiln reactor 20 to adjust the internal temperature profile of the continuous rotary kiln reactor 20 according to experimental conditions, and then inputs the sample. Here, the experimental conditions may include the number of zones in which the temperature is raised, the temperature raising rate of the temperature sections, the set temperature of each temperature section, the temperature of the inert gas, the amount of waste solids supplied, and the like.

When the temperature sections along the length (L) direction of the main body 21 are less than 6 zones, the internal temperature profile of the main body 21 is formed in a stepwise fashion in the longitudinal direction of the main body 21, so that a section in which the temperature is raised rapidly rather than a section in which the temperature is constantly raised is generated, and thus there is a difficulty in maintaining the raised temperature of the sample low. Here, the longitudinal direction of the main body 21 means the longest length from one end to the other end of the main body 21, and may mean a direction horizontal to the movement direction of the waste solid, or a direction from the waste solid supply unit 22 to the sample discharge unit 25.

Further, it is preferable that the set temperature of the first temperature section closest to the waste solid supply unit 22 among the temperature sections is 200° C. or lower. When the set temperature of the first temperature section among the temperature sections exceeds 200° C., the toxic substances in the waste solids are rapidly vaporized and discharged out of the continuous rotary kiln reactor 20, thereby reducing the efficiency of removing toxicity of the waste solids.

Further, since the set temperature of the first temperature section is adjusted to 200° C. or lower, a temperature section in which moisture contained in the waste solid may be evaporated is included, so that the drying device may be omitted, and thus there is an effect in that the pyrolysis process of the waste solid is simplified.

Each temperature section of the main body 21 is set to a maximum set temperature that can be raised, therefore, it is preferable that the temperatures of the temperature sections are not raised to the preset maximum temperature or higher. For example, the maximum set temperature of each temperature section may be less than the set temperature of the next section.

In the exemplary embodiment, in the temperature section, the temperature raising rate for raising the temperature of the waste solid raises the temperature at an average (or average temperature raising rate) 5° C./min or less to raise the temperature of the waste solid to a pyrolysis temperature. Here, the average temperature raising rate is a value calculated based on the time the temperature was raised during the entire temperature raising time.

For example, when the main body 21 has the temperature sections of six zones, the zone closest to the waste solid supply unit 22 is the first zone, and the zone number may increase toward the direction of the sample discharge unit 25.

The set temperature of each zone may be adjusted to 200° C. for a first zone, 250° C. for a second zone, 300° C. for a third zone, 350° C. for a fourth zone, 400° C. for a fifth zone, and 450° C. for a sixth zone, and the temperature raising rate may be adjusted to an average of 5° C./min.

The continuous rotary kiln reactor 20 may raise the temperature of the first to sixth zones of the main body 21 to the set temperature before the waste solids are supplied. The temperature of the waste solids may be raised to 200° C. while moving from the first zone to the second zone, and the temperatures of the waste solids may be raised from 200° C. to 250° C. while moving from the second zone to the third zone.

In the same manner as above, the waste solid may be discharged to the sample discharge unit 25 through the third to sixth zones.

In another exemplary embodiment, the main body 21 may include a temperature raising section and a temperature maintaining section along the longitudinal direction. The temperature rising section and the temperature maintaining section may each include one or more zones, and the temperature rising section preferably includes the temperature section of six or more temperature zones.

In this case, in the temperature rising section, the temperature may be raised to the pyrolysis temperature at a rate of 5° C./min or less from the waste solid supply unit 22 to the sample discharge unit 25, and the temperature maintaining section may maintain the pyrolysis temperature raised through the temperature raising section. In addition, in the temperature maintaining section, the pyrolysis temperature may be maintained at a temperature of 400° C. to 600° C. for 240 minutes or less. When the maintaining time of the temperature maintaining section exceeds 240 minutes, the effect of increasing the efficiency of removing the toxicity of waste solids is insignificant compared to the increase in the amount of energy used to maintain the temperature of the temperature maintaining section.

For example, when a main body 21 includes zone 5 of the temperature raising section and zone 1 of the temperature maintaining section, the set temperature of each zone may be adjusted to 200° C. for the first zone, 250° C. for the second zone, 300° C. for the third zone, 350° C. for the fourth zone, 400° C. for the fifth zone, and 400° C. for the sixth zone, and the temperature raising rate may be an average of 5° C./min.

When the temperature raising rate of the section (or temperature sections, temperature rising section) in which the temperature is raised according to the exemplary embodiment and other exemplary embodiments exceeds an average of 5° C./min, a problem in that the toxic substances contained in the waste solid is evaporated before decomposition occurs, and thus the efficiency of detoxification of the waste solid may be reduced.

The main body 21 is characterized in that the ratio of the diameter d to the length L is 1:8 to 1:20. When the diameter and length ratio of the main body 21 is less than 1:8, the length of the main body 21 is short compared to the available internal space, so that the supplied waste solids are accumulated in the width direction of the main body 21, and thus there may occur a problem in that heat cannot penetrate to the inside of the waste solid particles. When heat is not transferred to the inside of the waste solid in the form of particles, the harmful compounds contained in the waste solid cannot be completely decomposed. In addition, the section in which the temperature is raised is shortened and the pyrolysis time of the waste solid is also reduced, so that the waste solid cannot be sufficiently decomposed.

Further, when the diameter and length ratio of the main body 21 exceeds 1:20, the internal area of the main body 21 of which the temperature needs to be heated to the pyrolysis temperature is increased, so that the increase in thermal decomposition efficiency is insignificant compared to the input energy, which is not economical.

Here, the length of the main body 21 means the longest length in the axial direction of the main body 21, and the diameter of the main body 21 means the longest length in the direction perpendicular to the axial direction of the main body 21.

The main body 21 is rotatable, and as the main body 21 is rotated, the waste solid may continuously move from the waste solid supply unit 22 to the sample discharge unit 25, and an effect of increasing the rate of heat transfer into the waste solid may be exhibited.

That is, in the toxic waste treatment apparatus 100 according to the present disclosure, the waste solid may be moved from the pulverizing device 10 to the waste solid supply unit 22 by gravity. In addition, the waste solid may be continuously moved from the waste solid supply unit 22 to the continuous rotary kiln reactor 20 by the moving unit 22*b*. Further, the waste solid is continuously moved from the waste solid supply unit 22 to the sample discharge unit 25 by the rotation of the main body 21 in the continuous rotary kiln reactor 20, and accordingly, the waste solid may continuously move from the pulverizing device 10 until the detoxified sample is discharged.

In this case, in the continuous rotary kiln reactor 20, it may take 30 minutes or more and 10 hours or less until the waste solids are supplied from the waste solid supply unit 22 and are discharged to the sample discharge unit 25. That is, the waste solid may be pyrolyzed for 30 minutes or more and 10 hours or less. When the waste solid is pyrolyzed within the range of the pyrolysis time, toxic compounds contained in the waste solid may be efficiently removed by dechlorination or thermal destruction.

In another exemplary embodiment, the main body may further include a rotation module (not illustrated) having wings on the outer circumferential surface of the rotary body. The rotation module may increase the rate of heat transfer into the waste solid by flowing the waste solid by rotation, and may move the waste solid from the waste solid supply unit 22 to the sample discharge unit 25.

As the main body 21 forms the temperature sections of six or more zones, the plurality of heating units 26 may be provided, and preferably the heating units 26 may be provided in the same number as the number of temperature sections. In the heating unit 26, a set temperature, a temperature raising rate, and the like may be adjusted according to a temperature profile preset in each temperature section, and the toxic waste treatment apparatus 100 according to the present disclosure may further include a control unit (not illustrated) for adjusting the heating unit 26.

The heating unit 26 may raise each temperature section up to a set temperature and maintain the temperature of each temperature section.

The toxic waste treatment apparatus 100 according to the present disclosure may further include a temperature measuring sensor (not illustrated). The temperature measuring sensor measures the internal temperatures of the temperature sections, and may transmit temperature data of the temperature sections to the control unit.

The heating unit 26 may adjust the temperatures of the temperature sections to set temperatures through the control unit based on the temperature data of the temperature sections measured by the temperature measuring sensor, and may be controlled to raise the temperatures of the temperature sections according to the temperature raising rate set in the control unit, and not to raise the temperature of the temperature section to the maximum temperature or higher of each temperature section set in the control unit.

Figure 3:
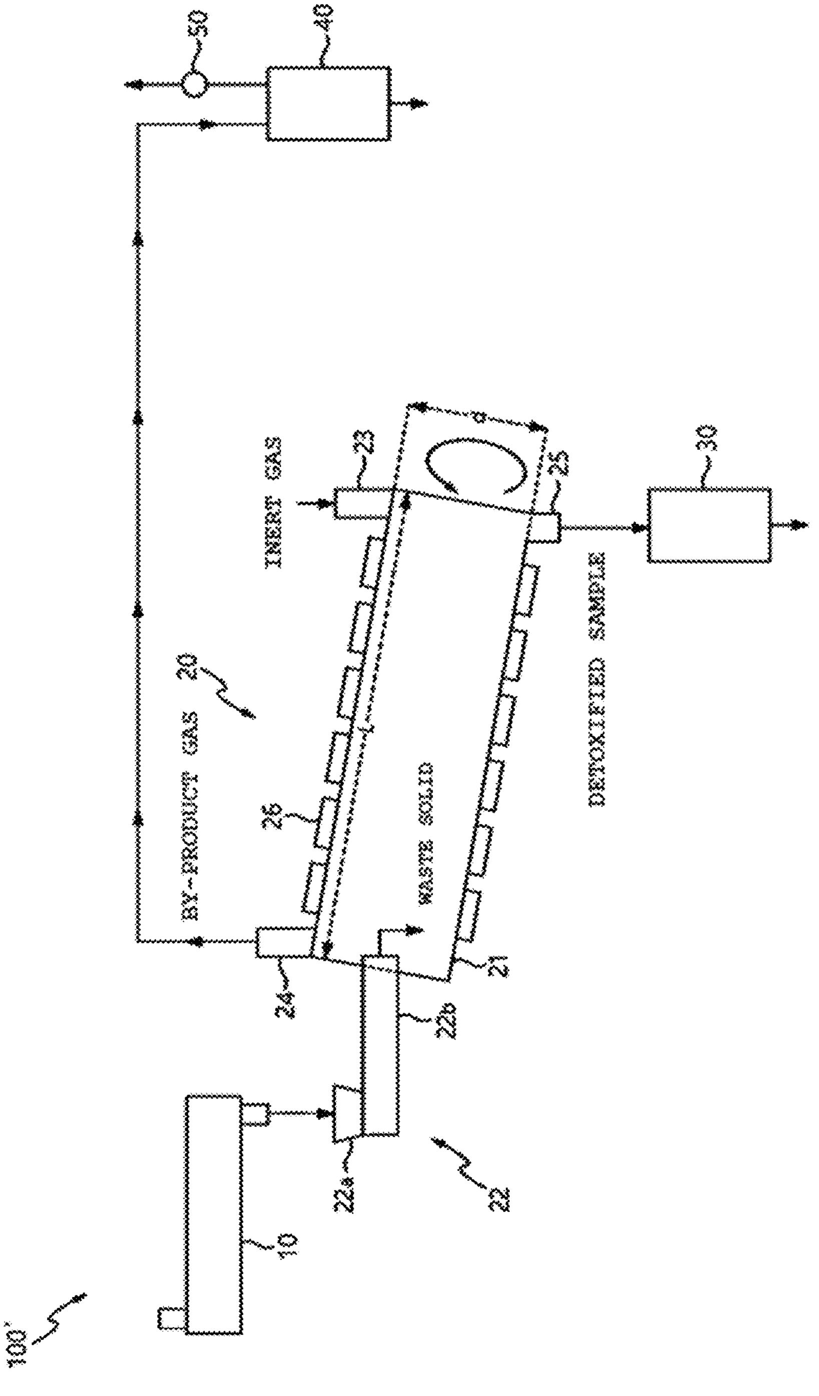
FIG. 3 is a block diagram illustrating a toxic waste treatment apparatus according to another exemplary embodiment of the present invention.

FIG. 3 is a diagram illustrating a toxic waste treatment apparatus 100' according to another exemplary embodiment of the present invention.

The toxic waste treatment apparatus 100' includes a pulverizing device 10, a continuous rotary kiln reactor 20, a cooling device 30, a condensation cleaner 40, and an activated carbon filter 50.

The pulverizing device 10, the continuous rotary kiln reactor 20, and the cooling device 30 have the same configurations as those of the toxic waste treatment apparatus 100 according to the exemplary embodiment, and a detailed description thereof will be omitted.

The cooling device 30 receives and cools a detoxified sample discharged from the sample discharge unit 25 of the continuous rotary kiln reactor 20.

In the detoxified sample, toxicity that is not completely decomposed and removed in the continuous rotary kiln reactor 20 may remain, and only partially decomposed toxicity may be resynthesized thereafter. Therefore, in order to prevent such resynthesis, it is preferable to cool the detoxified sample in which undecomposed toxicity may remain to remove energy required for resynthesis.

Accordingly, the cooling device 30 may cool the detoxified sample to 100° C. or less. When the detoxified sample exceeds 100° C., there may be a problem that undecomposed toxicity is resynthesized by using the energy required for resynthesis.

In addition, the detoxified sample may be moved by gravity from the sample discharge unit 25 to the cooling device 30. In the toxic waste treatment apparatus 100' according to another exemplary embodiment, the waste solid and the detoxified sample may be continuously moved from the pulverizing device 10 to the cooling device 30.

The condensing cleaner 40 is configured to remove some toxic components contained in the by-product gas generated in the continuous rotary kiln reactor 20, and may include at least one of a condensing unit for condensing the by-product gas and a cleaning unit for cleaning the by-product gas.

That is, the condensing cleaner 40 may liquefy the by-product gas and the toxic components contained in the by-product gas, and thus, the liquid product generated by liquefying the by-product gas may be re-supplied to a pretreatment apparatus.

The condensing unit is configured to primarily liquefy the by-product gas, and may lower the temperature of the by-product gas while the by-product gas moves from the continuous rotary kiln reactor 20 to the cleaning unit, or increase internal pressure of a flow path through which the by-product gas moves and liquefy the by-product gas.

In the exemplary embodiment, the condensing unit may lower the temperature of the by-product gas by injecting coolant or cooling gas into the flow path. Alternatively, the condensing unit may be provided in the form of a jacket in which coolant or cooling gas surrounds the outer circumferential surface of the flow path.

The cleaning unit collects toxic components contained in the liquid product obtained by liquefying the by-product gas, and gas from which the toxic components are removed may be generated.

In the exemplary embodiment, the cleaning unit may include one or more cleaning solutions in the form of an aqueous solution. For example, the cleaning solution in the form of an aqueous solution may include toluene, a basic material (for example, sodium hydroxide (NaOH)), and the like. The toluene cleaning solution may collect organic compounds contained in the liquid product, and the basic cleaning solution may collect acidic components.

A filter (not illustrated) may be further included in the toxic waste treatment apparatuses 100 and 100' according to the exemplary embodiment and another exemplary embodiment of the present invention.

After the liquid product reacts with the cleaning solution, gas from which toxic components are removed may be generated. The filter may remove harmful compounds contained in the by-product gas discharged from the continuous rotary kiln reactor 20 or the gas discharged from the condensing cleaner 40. Therefore, the filter may be provided in any one or more of the by-product gas discharge unit 24 from which the by-product gas is discharged from the continuous rotary kiln reactor 20 and the path through which the gas generated from the cleaning unit of the condensing cleaner 40 is discharged.

In the toxic waste treatment apparatus 100' according to another exemplary embodiment of the present invention, the by-product gas may be supplied to the condensing unit or the cleaning unit through the filter.

MODE FOR CARRYING OUT THE INVENTION

Hereinafter, examples and experimental examples will be described in more detail to describe the present invention in detail, but the present invention is not limited by these examples and experimental examples. Examples according to the present invention may be modified in various other forms, and the scope of the present invention should not be construed as being limited to the examples described below. The examples of the present invention are provided to more completely explain the present invention to those of ordinary skill in the art.

Prepare Sample

Samples having the toxic components of Table 1 below and the element contents of Table 2 below were prepared. The toxic component and the element content are based on a dry sample having a moisture content of 1 wt %. The weight ratio of organic matter and inorganic matter in the sample was almost 1:1, which was almost the same level. The Cu content of the sample was 2,730 ppm, and the Cl content was 20,000 ppm.

TABLE 1

| Toxic component | | Toxicity Equivalence Conversion Factor (I-TEF) | Toxicity Equivalence Conversion Concentration (pg I-TEQ/g) | Concentration by mass (pg/g) |
|---|---|---|---|---|
| PCDD | 2, 3, 7, 8-TCDD | 1 | 0 | 0 |
| | 1, 2, 3, 7, 8-PeCDD | 0.5 | 0 | 0 |
| | 1, 2, 3, 4, 7, 8-HxCDD | 0.1 | 0 | 0 |
| | 1, 2, 3, 6, 7, 8-HxCDD | 0.1 | 0 | 0 |
| | 1, 2, 3, 7, 8, 9-HxCDD | 0.1 | 0 | 0 |
| | 1, 2, 3, 4, 6, 7, 8-HpCDD | 0.01 | 42.76 | 4276 |
| | OCDD | 0.001 | 122.8 | 122800 |
| | Total PCDD | | 165.56 | 127076 |
| PCDF | 2, 3, 7, 8-TCDF | 0.1 | 57.91 | 579.1 |
| | 1, 2, 3, 7, 8-PeCDF | 0.05 | 181.81 | 3636.2 |
| | 2, 3, 4, 7, 8-PeCDF | 0.5 | 1607.2 | 3214.4 |
| | 1, 2, 3, 4, 7, 8-HxCDF | 0.1 | 1568.57 | 15685.7 |
| | 1, 2, 3, 6, 7, 8-HxCDF | 0.1 | 1105.71 | 11057.1 |
| | 1, 2, 3, 7, 8, 9-HxCDF | 0.1 | 834.35 | 8343.5 |
| | 2, 3, 4, 6, 7, 8-HxCDF | 0.1 | 2741.62 | 27416.2 |
| | 1, 2, 3, 4, 6, 7, 8-HpCDF | 0.01 | 9578.84 | 957884 |
| | 1, 2, 3, 4, 7, 8, 9-HpCDF | 0.01 | 1796.88 | 179688 |
| | OCDF | 0.001 | 76716.4 | 76716400 |
| | Total PCDE | | 96189.29 | 77923904.2 |
| | Total PCDD/PCDE | | 96354.85 | 78050980.2 |

TABLE 2

| | (ppm) |
|---|---|
| Na | 6,900 |
| Mg | 18,900 |
| Al | 53,000 |
| Ca | 104,000 |
| Cr | 370 |
| Cu | 2,730 |
| Fe | 135,000 |
| Si | 350 |
| Mn | 990 |
| Ni | 310 |
| Zn | — |
| P | <10 |
| Cl | 20,000 |
| S | 10 |

Example 1

A sample (sample amount 10 g, moisture content 31 wt %) was input into an electric furnace, and $N_2$ was input (0.2 LPM) to create an anaerobic atmosphere.

Then, after raising the temperature to a reaction temperature of 400° C. at an average temperature raising rate of 2.2° C./min, heat treatment was performed at the reaction temperature for 2 hours. After the heat treatment, the residual toxicity in the waste solid and the toxicity in the by-product gas were measured and illustrated in Tables 3 and 4 below.

TABLE 3

| Toxic component | | Toxicity Equivalence Conversion Factor (I-TEF) | Residual toxicity of waste solid: Toxicity Equivalence Conversion Concentration (pg I-TEQ/g) $N_2$ | Residual toxicity of waste solid: Concentration by mass (pg/g) $N_2$ |
|---|---|---|---|---|
| PCDD | 2, 3, 7, 8-TCDD | 1 | 0 | 0 |
| | 1, 2, 3, 7, 8-PeCDD | 0.5 | 0 | 0 |
| | 1, 2, 3, 4, 7, 8-HxCDD | 0.1 | 3 | 33 |
| | 1, 2, 3, 6, 7, 8-HxCDD | 0.1 | 0 | 0 |
| | 1, 2, 3, 7, 8, 9-HxCDD | 0.1 | 0 | 0 |
| | 1, 2, 3, 4, 6, 7, 8-HpCDD | 0.01 | 0 | 0 |
| | OCDD | 0.001 | 0 | 90 |
| | Total PCDD | | 3 | 123 |
| PCDF | 2, 3, 7, 8-TCDF | 0.1 | 0 | 0 |
| | 1, 2, 3, 7, 8-PeCDF | 0.05 | 0 | 0 |
| | 2, 3, 4, 7, 8-PeCDF | 0.5 | 24 | 49 |
| | 1, 2, 3, 4, 7, 8-HxCDF | 0.1 | 9 | 92 |
| | 1, 2, 3, 6, 7, 8-HxCDF | 0.1 | 12 | 121 |
| | 1, 2, 3, 7, 8, 9-HxCDF | 0.1 | 0 | 0 |
| | 2, 3, 4, 6, 7, 8-HxCDF | 0.1 | 11 | 106 |
| | 1, 2, 3, 4, 6, 7, 8-HpCDF | 0.01 | 6 | 550 |
| | 1, 2, 3, 4, 7, 8, 9-HpCDF | 0.01 | 0 | 0 |
| | OCDF | 0.001 | 3 | 3,100 |
| | Total PCDF | | 65 | 4,018 |
| | Total PCDD/PCDF | | 68 | 4,141 |

TABLE 4

| Toxic component | | Toxicity Equivalence Conversion Factor (I-TEF) | Discharged gaseous toxicity: Toxicity Equivalence Conversion Concentration (pg I-TEQ/g) $N_2$ | Discharged gaseous toxicity: Concentration by mass (pg/g) $N_2$ |
|---|---|---|---|---|
| PCDD | 2, 3, 7, 8-TCDD | 1 | 113 | 113 |
| | 1, 2, 3, 7, 8-PeCDD | 0.5 | 0 | 0 |
| | 1, 2, 3, 4, 7, 8-HxCDD | 0.1 | 2 | 20 |
| | 1, 2, 3, 6, 7, 8-HxCDD | 0.1 | 1 | 14 |
| | 1, 2, 3, 7, 8, 9-HxCDD | 0.1 | 0 | 0 |
| | 1, 2, 3, 4, 6, 7, 8-HpCDD | 0.01 | 1 | 52 |
| | OCDD | 0.001 | 0 | 60 |
| | Total PCDD | | 117 | 259 |
| PCDF | 2, 3, 7, 8-TCDF | 0.1 | 2,669 | 26,689 |
| | 1, 2, 3, 7, 8-PeCDF | 0.05 | 1,126 | 22,530 |
| | 2, 3, 4, 7, 8-PeCDF | 0.5 | 4,659 | 9,318 |
| | 1, 2, 3, 4, 7, 8-HxCDF | 0.1 | 953 | 9,533 |
| | 1, 2, 3, 6, 7, 8-HxCDF | 0.1 | 1,425 | 14,249 |
| | 1, 2, 3, 7, 8, 9-HxCDF | 0.1 | 45 | 450 |
| | 2, 3, 4, 6, 7, 8-HxCDF | 0.1 | 563 | 5,626 |
| | 1, 2, 3, 4, 6, 7, 8-HpCDF | 0.01 | 332 | 33,206 |
| | 1, 2, 3, 4, 7, 8, 9-HpCDF | 0.01 | 12 | 1,246 |
| | OCDF | 0.001 | 8 | 8,470 |
| | Total PCDF | | 11,793 | 131,316 |
| | Total PCDD/PCDE | | 11,910 | 131,575 |

According to Table 3 and Table 4, the total toxicity removal rate was 88%, the residual toxic concentration was 68 pg I-TEQ/g, and the average degree of chlorine substitution of the toxic components (PCDF, PCDD) discharged as by-product gas was 5.7.

Example 2

Example 2 was carried out in the same manner as in Example 1, except that $N_2$ was replaced with air (1.0 LPM). After the heat treatment, residual toxicity in waste solids and toxicity in by-product gas were measured and illustrated in Tables 5 and 6 below.

TABLE 5

| Toxic component | | Toxicity Equivalence Conversion Factor (I-TEF) | Residual toxicity of waste solid: Toxicity Equivalence Conversion Concentration (pg I-TEQ/g) Air | Residual toxicity of waste solid: Concentration by mass (pg/g) Air |
|---|---|---|---|---|
| PCDD | 2, 3, 7, 8-TCDD | 1 | 0 | 0 |
| | 1, 2, 3, 7, 8-PeCDD | 0.5 | 0 | 0 |
| | 1, 2, 3, 4, 7, 8-HxCDD | 0.1 | 11 | 108 |
| | 1, 2, 3, 6, 7, 8-HxCDD | 0.1 | 11 | 109 |
| | 1, 2, 3, 7, 8, 9-HxCDD | 0.1 | 10 | 97 |
| | 1, 2, 3, 4, 6, 7, 8-HpCDD | 0.01 | 7 | 666 |
| | OCDD | 0.001 | 2 | 1,500 |
| | Total PCDD | | 40 | 2,480 |
| PCDF | 2, 3, 7, 8-TCDF | 0.1 | 6 | 65 |
| | 1, 2, 3, 7, 8-PeCDF | 0.05 | 17 | 339 |
| | 2, 3, 4, 7, 8-PeCDF | 0.5 | 219 | 439 |
| | 1, 2, 3, 4, 7, 8-HxCDF | 0.1 | 128 | 1,277 |
| | 1, 2, 3, 6, 7, 8-HxCDF | 0.1 | 120 | 1,198 |
| | 1, 2, 3, 7, 8, 9-HxCDF | 0.1 | 39 | 390 |
| | 2, 3, 4, 6, 7, 8-HxCDF | 0.1 | 436 | 4,356 |
| | 1, 2, 3, 4, 6, 7, 8-HpCDF | 0.01 | 273 | 27,336 |
| | 1, 2, 3, 4, 7, 8, 9-HpCDF | 0.01 | 39 | 3,850 |
| | OCDE | 0.001 | 117 | 117,100 |
| | Total PCDF | | 1,394 | 156,348 |
| | Total PCDD/PCDE | | 1,433 | 158,828 |

TABLE 6

| Toxic component | | Toxicity Equivalence Conversion Factor (I-TEF) | Discharged gaseous toxicity Toxicity Equivalence Conversion Concentration (pg I-TEQ/g) Air | Concentration by mass (pg/g) Air |
|---|---|---|---|---|
| PCDD | 2, 3, 7, 8-TCDD | 1 | 0 | 0 |
| | 1, 2, 3, 7, 8-PeCDD | 0.5 | 0 | 0 |
| | 1, 2, 3, 4, 7, 8-HxCDD | 0.1 | 3 | 35 |
| | 1, 2, 3, 6, 7, 8-HxCDD | 0.1 | 0 | 0 |
| | 1, 2, 3, 7, 8, 9-HxCDD | 0.1 | 2 | 18 |
| | 1, 2, 3, 4, 6, 7, 8-HpCDD | 0.01 | 2 | 233 |
| | OCDD | 0.001 | 2 | 1,940 |
| | Total PCDD | | 10 | 2,225 |
| PCDF | 2, 3, 7, 8-TCDF | 0.1 | 125 | 1,253 |
| | 1, 2, 3, 7, 8-PeCDF | 0.05 | 144 | 2,886 |
| | 2, 3, 4, 7, 8-PeCDF | 0.5 | 1,432 | 2,864 |
| | 1, 2, 3, 4, 7, 8-HxCDF | 0.1 | 684 | 6,836 |
| | 1, 2, 3, 6, 7, 8-HxCDF | 0.1 | 745 | 7,451 |
| | 1, 2, 3, 7, 8, 9-HxCDF | 0.1 | 107 | 1,066 |
| | 2, 3, 4, 6, 7, 8-HxCDF | 0.1 | 3,644 | 36,440 |
| | 1, 2, 3, 4, 6, 7, 8-HpCDF | 0.01 | 1,859 | 185,901 |
| | 1, 2, 3, 4, 7, 8, 9-HpCDF | 0.01 | 166 | 16,581 |
| | OCDF | 0.001 | 755 | 755,120 |
| | Total PCDF | | 9,661 | 1,016,398 |
| Total PCDD/PCDE | | | 9,670 | 1,018,624 |

According to Table 5 and Table 6, the total toxicity removal rate was 89 wt %, the residual toxic concentration was 1,433 pg I-TEQ/g, and the average degree of chlorine substitution of the toxic components (PCDF, PCDD) discharged as by-product gas was 7.7.

Example 3, Comparative Example 1, Comparative Example 2

Example 3, Comparative Example 1, and Comparative Example 2 were carried out in the same manner as in Example 1, except that the reaction conditions, atmosphere, and average temperature raising rate were as illustrated in Table 7 below. After heat treatment, residual toxicity in waste solids and toxicity in by-product gas were measured and illustrated in Table 7 below.

TABLE 7

| | Example 1 | Example 2 | Example 3 | Comparative Example 1 | Comparative Example 2 |
|---|---|---|---|---|---|
| Reaction condition | 400° C., 2 hours | 400° C., 2 hours | 500° C., 1 hour | 400° C., 2 hours | 500° C., 5 hours |
| Average temperature raising rate (° C./min) | 2.2 | 2.2 | 1.0 | 5.8 | 10 |
| Atmosphere | $N_2$ | Air | $N_2$ | $N_2$ | $N_2$ |
| Toxicity removal rate (%) | 88 | 89 | 91 | 32 | −28.9 |
| Waste Solid Residual Toxic Concentration (pg I-TEQ/g) | 65 | 1,433 | 47 | 1,062 | 41 |

TABLE 7-continued

| | Example 1 | Example 2 | Example 3 | Comparative Example 1 | Comparative Example 2 |
|---|---|---|---|---|---|
| Average degree of chlorine substitution of discharged gaseous toxicity | 5.7 | 7.7 | 5.5 | 6.2 | 6.5 |

As illustrated in Table 7, in Examples 1 to 3 in which the temperature raising rate is controlled, it can be confirmed that the total toxicity removal rate is very high compared to the comparative example.

The invention claimed is:

1. A process for treating toxic waste, the process comprising:
- raising a temperature of a toxic waste solid in a temperature section to a heat treatment temperature selected from 300° C. to 600° C. at an average temperature raising rate of 5° C./min or less, in a temperature raising operation;
- conducting a heat treatment by heat-treating the toxic waste solid at the heat treatment temperature; and
- wherein heat is supplied to the toxic waste solid by dividing the temperature section into six zones or more, the temperatures of each zone being different from each other.

2. A process for treating toxic waste, the process comprising:
- raising a temperature of a toxic waste solid in a temperature section to a heat treatment temperature selected from 300° C. to 600° C., wherein when the temperature of the toxic waste solid is 200° C. or higher, a temperature raising rate is adjusted to 5° C./min or less on average;
- heat-treating the toxic waste solid at the heat treatment temperature; and
- wherein heat is supplied to the toxic waste solid by dividing the temperature section into six zones or more, the temperatures of each zone being different from each other.

3. The process of claim 1, wherein the temperature raising rate is 1° C./min to 2.5° C./min on average.

4. The process of claim 1, further comprising:
- before the temperature raising operation, performing a preliminary heat treatment on the toxic waste solid at 200° C. or less.

5. The process of claim 1, wherein the toxic waste solid has a toxic concentration of 10,000-200,000 pg I-TEQ/g based on a dry sample with a moisture content of 1 wt % or less.

6. The process of claim 1, wherein a content of octachlorinated dibenzofuran (OCDF) and octachlorinated dibenzodioxin (OCDD) in toxic polychlorinated dibenzofuran (PCDF) and polychlorinated dibenzodioxin (PCDD) contained in the toxic waste solid is 90 wt % or more.

7. The process of claim 1, further comprising:
- forming the toxic waste solid before the temperature raising operation by inputting a coagulant to toxic wastewater, separating a solid and a liquid in a flotation tank, and performing a dehydration operation.

8. The process of claim 7, further comprising:
- after forming the toxic waste solid, at least one of the dehydration operation, a particle size or component adjusting operation, a pulverizing or crushing operation, or a drying operation.

9. The process of claim 7, further comprising:

re-inputting a dewatering filtrate generated in the dehydration operation to a front end of the flotation tank or a toxic wastewater treatment process.

10. The process of claim 8, wherein the particle size or component adjusting operation is performed by an agglomeration or flotation process.

11. The process of claim 1, wherein the heat treatment operation is performed for a time of 30 minutes or more and 10 hours or less.

12. The process of claim 1, wherein residual toxicity in the toxic waste solid after the heat treatment operation is 3,000 pg I-TEQ/g or less.

13. The process of claim 1, further comprising:

removing a toxic component from by-product gas generated in the heat treatment operation.

14. The process of claim 13, wherein the removing of the toxic component from the by-product gas includes an operation selected from a high temperature incineration operation, an operation of returning to the start of the heat treatment process after liquefaction and incinerating the toxic waste solid at a high temperature, an operation of liquefaction and re-inputting the liquid from the liquefaction to a wastewater disposal plant after scrubbing or liquefaction, an operation of collecting dust, and an operation of performing catalytic decomposition.

15. The process of claim 1, wherein a moisture content of the toxic waste solid input to the temperature raising operation is more than 0 wt % and 90 wt % or less, and a pH is 5 to 10.

16. The process of claim 1, wherein the heat treatment operation is performed under a nitrogen atmosphere or an atmosphere in which a concentration of oxygen is 21 vol % or less.

17. The process of claim 1, wherein the toxic waste solid is a wastewater sludge generated as a by-product of a petrochemical process.

18. The process of claim 1, wherein an average degree of chlorine substitution of toxic PCDF contained in by-product gas generated in the heat treatment operation is 4 to 8.

19. The process of claim 1, wherein the toxic waste solid has a Cu content of 0 ppm to 10,000 ppm and a Cl content of 0 ppm to 100,000 ppm based on a dry sample with a moisture content of 1 wt % or less.

* * * * *